(12) United States Patent
Peng et al.

(10) Patent No.: US 11,689,694 B2
(45) Date of Patent: Jun. 27, 2023

(54) INFORMATION PROCESSING APPARATUS AND COMPUTER READABLE MEDIUM

(71) Applicant: FUJIFILM BUSINESS INNOVATION CORP., Tokyo (JP)

(72) Inventors: Xinyu Peng, Yokohama (JP); Takashi Hashizume, Yokohama (JP); Masafumi Chikyu, Yokohama (JP); Shuhei Kawashima, Yokohama (JP); Yoshihiro Kudo, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 101 days.

(21) Appl. No.: 17/368,183

(22) Filed: Jul. 6, 2021

(65) Prior Publication Data
US 2022/0295011 A1    Sep. 15, 2022

(30) Foreign Application Priority Data
Mar. 15, 2021    (JP) .................................. 2021-041106

(51) Int. Cl.
| | | |
|---|---|---|
| *H04N 7/15* | (2006.01) | |
| *G06F 16/532* | (2019.01) | |
| *G06F 18/22* | (2023.01) | |
| *G06V 40/16* | (2022.01) | |
| *G06Q 99/00* | (2006.01) | |
| *H04L 65/403* | (2022.01) | |

(52) U.S. Cl.
CPC .............. *H04N 7/15* (2013.01); *G06F 16/532* (2019.01); *G06F 18/22* (2023.01); *G06Q 99/00* (2013.01); *G06V 40/161* (2022.01); *H04L 65/403* (2013.01)

(58) Field of Classification Search
None
See application file for complete search history.

(56) References Cited

U.S. PATENT DOCUMENTS

| | | | |
|---|---|---|---|
| 2007/0188596 A1* | 8/2007 | Kenoyer | H04L 65/4046 348/E7.084 |
| 2007/0188598 A1 | 8/2007 | Kenoyer | |
| 2009/0033737 A1* | 2/2009 | Goose | H04N 7/15 348/E7.083 |

(Continued)

FOREIGN PATENT DOCUMENTS

| | | |
|---|---|---|
| JP | H06-121310 A | 4/1994 |
| JP | 2004-129071 A | 4/2004 |

(Continued)

OTHER PUBLICATIONS

Feb. 3, 2022 Search Report issued in European Patent Application No. 21190494.1.

*Primary Examiner* — Stella L. Woo
(74) *Attorney, Agent, or Firm* — Oliff PLC

(57) ABSTRACT

An information processing apparatus includes: a processor configured to specify, in a conference in which plural participants participate via a communication line, a first business card image obtained by reading a business card of a first participant of the conference based on an image obtained by photographing the first participant, and display the first business card image in a display manner different from a display manner for a second business card image of a second participant of the conference, the second participant being different from the first participant.

8 Claims, 13 Drawing Sheets

(56) References Cited

U.S. PATENT DOCUMENTS

2012/0081506 A1* 4/2012 Marvit ................. H04N 7/15
   348/E7.083
2020/0059561 A1* 2/2020 Murali ................ H04M 3/568

FOREIGN PATENT DOCUMENTS

| JP | 2009-164821 A | 7/2009 |
| JP | 2013-105470 A | 5/2013 |
| KR | 10-1325718 B1 | 11/2013 |
| WO | 2010/010736 A1 | 1/2010 |

\* cited by examiner

FIG. 4

| 402 | 404 | 406 | 408 | 410 | 412 |
|---|---|---|---|---|---|
| CONFERENCE ID | START DATE AND TIME | CONFERENCE TIME | USER ID | USER PASSWORD | URL |
| | | | | | |

| 502 | 504 | 506 | 508 | 510 | |
|---|---|---|---|---|---|
| CONFERENCE ID | PARTICIPANT NUMBER | USER ID | BUSINESS CARD IMAGE | FACE IMAGE | ... |

500

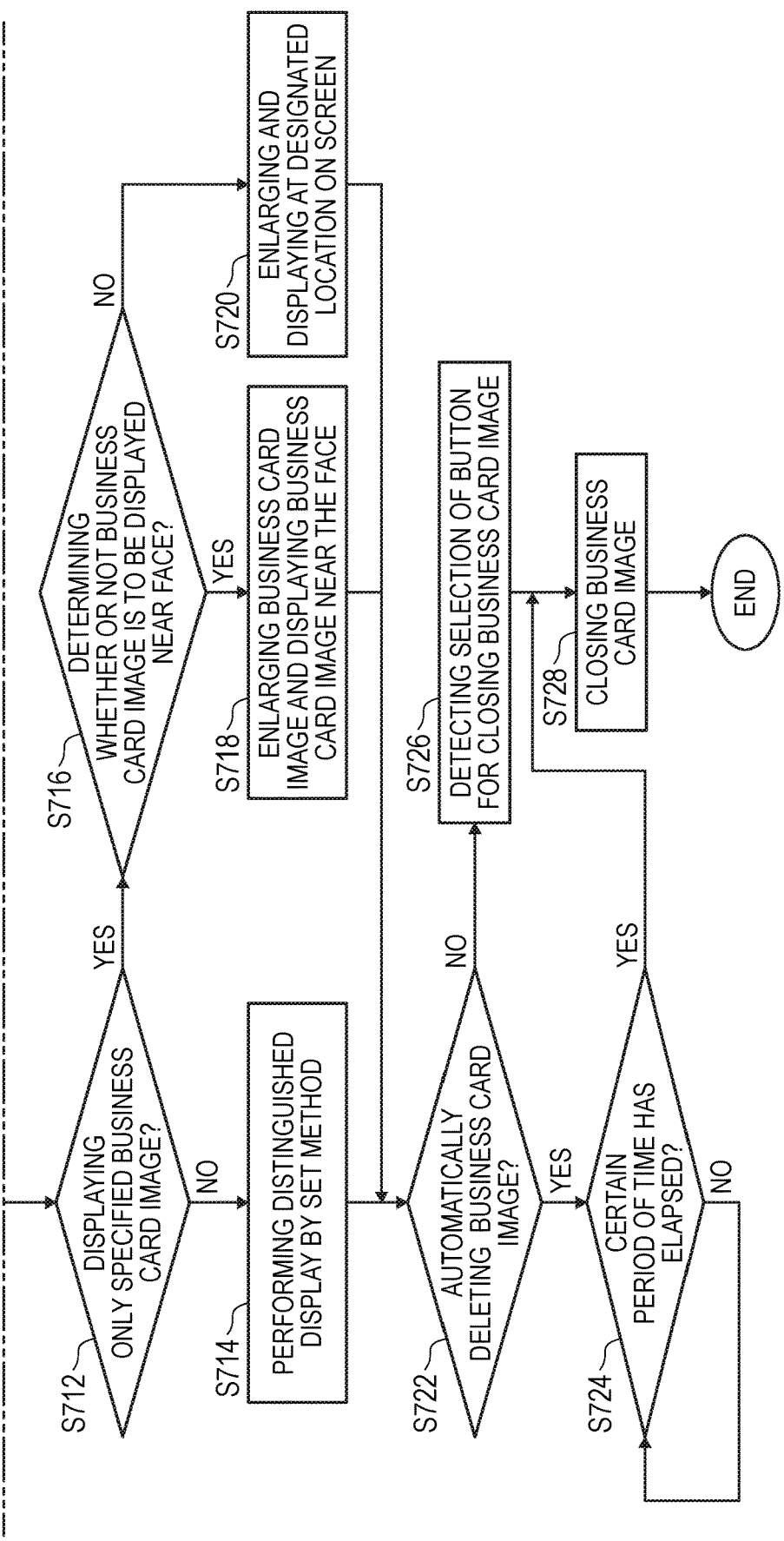

| USER ID | SEARCH METHOD | BUSINESS CARD IMAGE TO BE DISPLAYED | DISPLAY MANNER | DISTINCTION DISPLAY TIME |
|---|---|---|---|---|
| | | | | |

A SETTING SCREEN OF DISPLAY METHOD OF SPECIFIED BUSINESS CARD

☒ AUTOMATIC SEARCH BASED ON FACE IMAGE
☐ SEARCH BASED ON INSTRUCTIONS WITH BUSINESS CARD SEARCH BUTTON

☒ DISPLAY LIST OF EXCHANGED BUSINESS CARD IMAGES
  ☐ DISPLAY SPECIFIED BUSINESS CARD IMAGE AT THE TOP
  ☒ HIGHLIGHT SPECIFIED BUSINESS CARD IMAGE
  ☐ DISPLAY SPECIFIED BUSINESS CARD IMAGE IN LARGER SIZE

☐ DISPLAY ONLY THE SPECIFIED BUSINESS CARD IMAGE
  ☐ DISPLAY AT UPPER LEFT (LOWER LEFT) OF SCREEN
  ☐ DISPLAY AT UPPER RIGHT (LOWER RIGHT) OF SCREEN
  ☐ DISPLAY NEAR THE PERSON IMAGE ON SCREEN

TIME TO DISPLAY THE SPECIFIED BUSINESS CARD IMAGE IN DISTINGUISHED MANNER FROM OTHER BUSINESS CARD IMAGES
☒ DISPLAY WITHIN FIXED TIME
  ☒ ONE MINUTE
  ☐ 30 SECONDS
☐ DISPLAY UNTIL MANUALLY DELETED

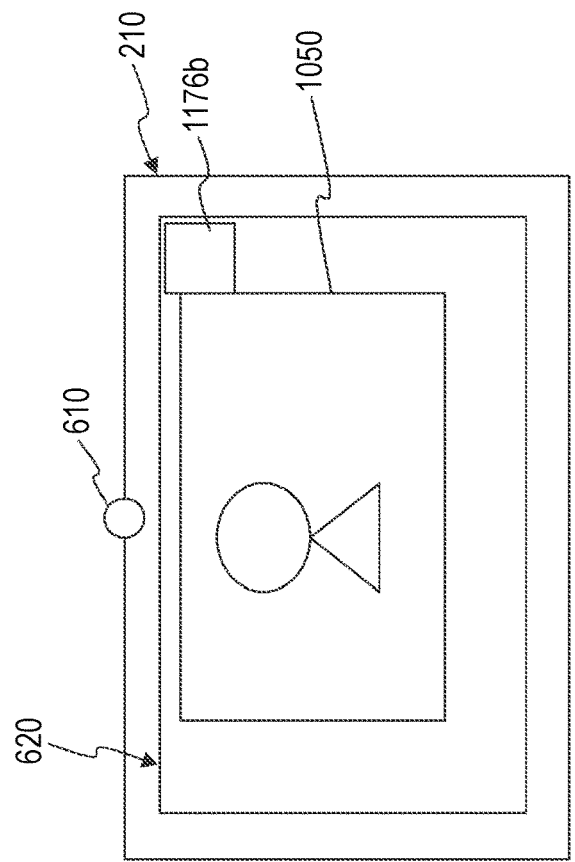
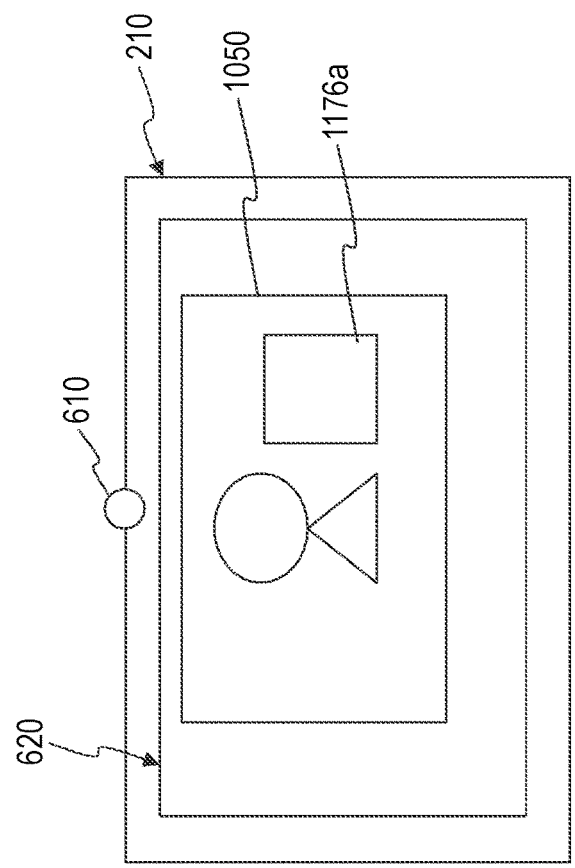
FIG. 11A
FIG. 11B

INFORMATION PROCESSING APPARATUS AND COMPUTER READABLE MEDIUM

CROSS-REFERENCE TO RELATED APPLICATIONS

This application is based on and claims priority under 35 USC 119 from Japanese Patent Application No. 2021-041106 filed on Mar. 15, 2021.

BACKGROUND

Technical Field

The present invention relates to an information processing apparatus and a computer readable medium for storing an information processing program.

Related Art

JP-A-2009-164821 discloses an imaging apparatus including a CPU that performs a process of detecting faces of the plural persons from the image data of a set photograph generated by an imaging unit to generate plural face image data of faces, a process of recording the plural face image data as a same group, and a process of executing the face image data utilization process based on the plural face image data when it is determined that the execution of the face image data utilization process using the plural face image data recorded as the same group is instructed, in order to easily record and manage information of plural persons who meet the same place and time.

JP-A-2013-105470 discloses providing an electronic business card device for exchanging business card data, the electronic business card device including a storage medium that records business card data of an owner (hereinafter referred to as "self-business card data") and business card data of a business card data exchange partner (hereinafter referred to as "exchange partner business card data"); a business card data exchange unit that receives exchange partner business card data from an electronic business card device possessed by a business card data exchange partner and records the business card data in a storage medium, and transmits the self-business card data recorded in the storage medium to an electronic business card terminal carried by the business card data exchange partner to exchange business card data; a display unit that displays, on a display device, a display screen in which display regions displaying specific information for specifying the business card data exchange partner in a predetermined arrangement order based on the exchange partner business card data recorded in the storage medium; and a replacement unit that replaces an arrangement position of the display region arranged on the display screen by the display unit with an arrangement position of another display region based on an instruction from the owner.

JP-A-06-121310 discloses, before the start of the video conference communication, a person image recognition unit generates a parameter required for person image recognition from a person image of a conference participant input from the television camera and registers the profile of the conference participant in the hard disk correspondingly, and during video conferencing communication, when a profile is requested for the conference participant displayed on the display of the other terminal, the person image recognition unit generates a recognition parameter of the person appearing in the television camera again, and collates the registration parameter matching the generated recognition parameter with the hard disk, and a system control unit sends the profile corresponding to the matching registration parameter to the other terminal of the request source and displays the profile on the display of the other terminal, in order to display a profile of a recognized person on the display by recognizing each conference participant by using the person image recognition technique.

SUMMARY

In a case where a conference is held via a communication line by plural participants, a business card image of a participant may be displayed in order to make the name or the like of the participant known. However, it is difficult for the user to associate the participant with the business card image.

Aspects of non-limiting embodiments of the present disclosure relate to providing an information processing apparatus that allows a user to identify association between at least one participant among participants of a conference and a business card image and a computer readable medium for storing an information processing program.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to specify, in a conference in which plural participants participate via a communication line, a first business card image obtained by reading a business card of a first participant of the conference based on an image obtained by photographing the first participant, and display the first business card image in a display manner different from a display manner for a second business card image of a second participant of the conference, the second participant being different from the first participant.

BRIEF DESCRIPTION OF DRAWINGS

Exemplary embodiment(s) of the present invention will be described in detail based on the following figures, wherein:

FIG. 4 is an explanatory diagram illustrating an example of a data structure of a reservation information table;

FIG. 5 is an explanatory diagram illustrating an example of a data structure of an image management table;

FIG. 9 is an explanatory diagram illustrating a display example according to the exemplary embodiment.

FIGS. 11A and 11B are explanatory diagrams illustrating display examples according to the exemplary embodiment;

DETAILED DESCRIPTION

Hereinafter, an exemplary embodiment of the present invention will be described with reference to the drawings.

Figure 1:
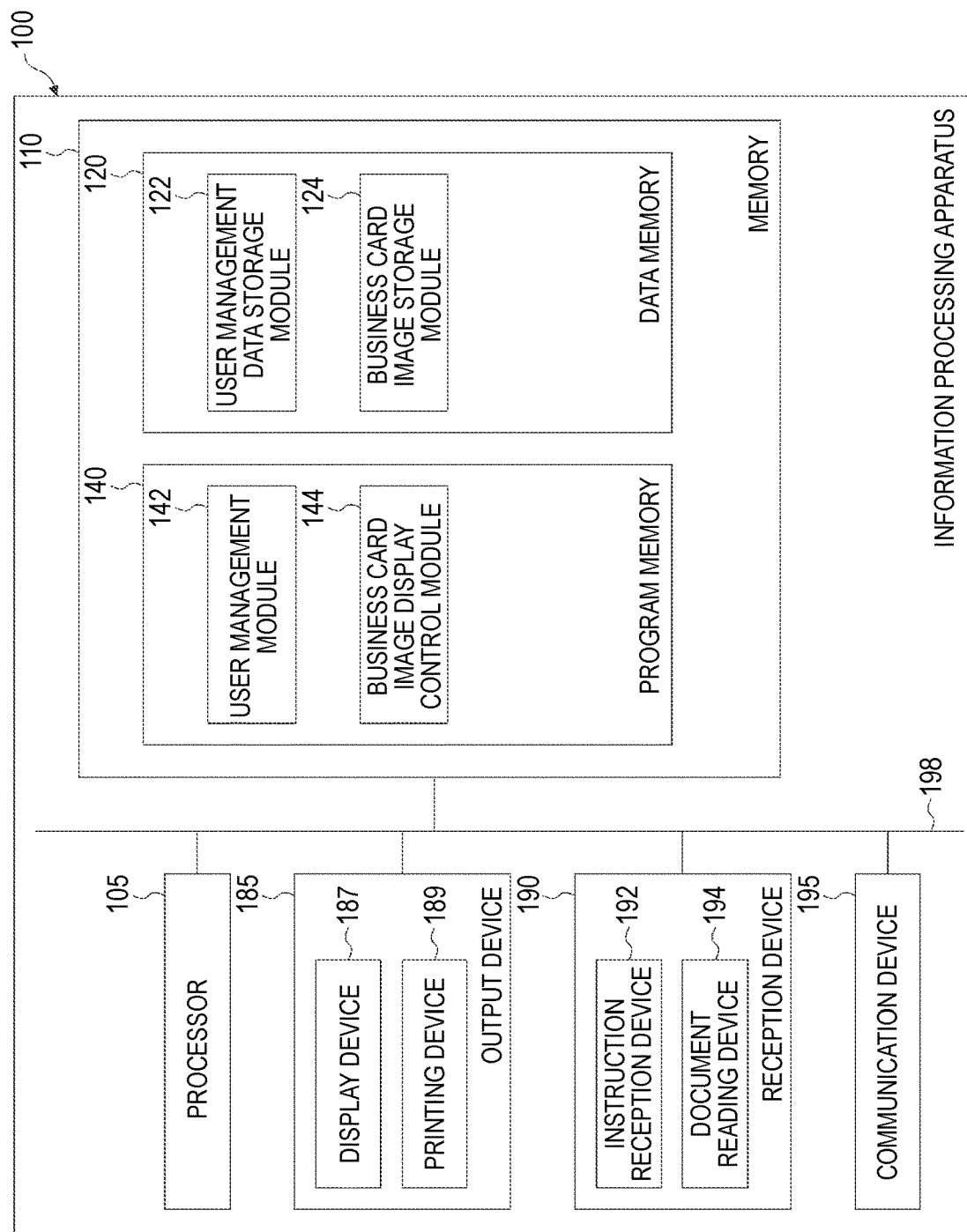
FIG. 1 is a conceptual module configuration diagram illustrating a configuration example according to an exemplary embodiment.

FIG. 1 illustrates a conceptual module configuration diagram for a configuration example according to the exemplary embodiment.

The term "module" generally refers to a logically separable component such as software (including a computer program as an interpretation of "software"), hardware, or the like. Therefore, the module in the present exemplary embodiment refers to not only a module in a computer program but also a module in a hardware configuration. Therefore, the exemplary embodiment also serves as a description of a computer program (for example, a program for causing a computer to execute each procedure, a program for causing a computer to function as each unit, a program for causing a computer to realize each function), a system, and a method for functioning these modules. However, although terms "store" and "stored" and their equivalents are used for the sake of convenience of description, these terms mean that being stored in a storage device or controlled to be stored in a storage device when the exemplary embodiment is a computer program. In implementation, modules may have a one-to-one correspondence with functions, in the implementation, one module may be configured by one program, plural modules may be configured by one program, and conversely, one module may be configured by plural programs. Plural modules may be executed by one computer, or one module may be executed by plural computers in a distributed or parallel environment. One module may include another module. Hereinafter, "connection" is used not only for physical connection but also for logical connections (for example, transmission and reception of data, instruction, reference relationship between data, login, or the like). The term "predetermined" means determined prior to the target process, and includes the meaning of being determined according to the situation or state at that time or according to the situation or state up to that time even after the process according to the present exemplary embodiment starts, as a matter of course, before the processing according to the exemplary embodiment starts. When there are plural "predetermined values", the values may be different from each other, or two or more values ("two or more values" may include, of course, all values) may be the same. In addition, a description of "when A, do B" is used in the meaning of "determine whether or not it is A, do B when it is determined to be A". However, a case where it is not necessary to determine whether or not it is A is excluded. In addition, when a thing is listed such as "A, B, C" and the like, "A, B, C" and the like are only examples unless otherwise specified, and include a case where only one of them is selected (for example, only A).

In addition, the system or the apparatus may be configured such that plural computers, hardware, apparatuses, and the like are connected by a communication unit such as a network ("network" including a one-to-one communication connection), or may be realized by a single computer, hardware, an apparatus, or the like. The terms "apparatus" and "system" are used as terms having the same meaning. Of course, the "system" does not include anything that is nothing more than a social "mechanism" (that is, a social system) that is an artificial agreement.

In addition, target information is read from the storage device for each process by each module or for each process when plural processes are performed in the module, and after the processes are performed, a processing result is written to the storage device. Therefore, description of the reading from the storage device before the process and the writing to the storage device after the process may be omitted.

The information processing apparatus 100 according to the exemplary embodiment has a function of displaying a business card image of a participant of the conference (hereinafter, also referred to as a business card image display service) in a conference via a communication line. As illustrated in the example of FIG. 1, the information processing apparatus 100 includes at least a processor 105 and a memory 110, and is configured by a bus 198 for connecting the processor and the memory and exchanging data. In addition, the information processing apparatus 100 may include an output device 185, a reception device 190, and a communication device 195. Data is exchanged between the processor 105, the memory 110, the output device 185, the reception device 190, and the communication device 195 via the bus 198.

Here, the "conference via a communication line" is a conference that is held by photographing each participant (mainly a face of each participant) with a camera on a terminal owned by each person or a terminal used by plural persons, converting a speech of each participant into an audio signal by a microphone, distributing the photographed image and the audio signal to a terminal of each participant, displaying the received image, and outputting the audio signal as a sound by a speaker. The "conference via a communication line" includes an online conference, a Web conference, a TV conference, a video chat, or the like. The communication line may be a dedicated line, a general-purpose line, or may be, for example, an intranet or the Internet. The terminal may be a dedicated device, or may be a general-purpose device such as a personal computer or a portable terminal.

In addition, the "conference" in the exemplary embodiment includes not only "gatherings for the purpose of consultation and discussion", but also gatherings for other purposes, such as "face-to-face events", "get-together meetings (so-called online drinking parties)", or the like.

Note that the block diagram illustrated in the example of FIG. 1 also illustrates an example of a hardware configuration of a computer that realizes the exemplary embodiment. The hardware configuration of the computer in which the program according to the exemplary embodiment is executed is that illustrated in FIG. 1, specifically of a personal computer or a server. As a specific example, a processor 105 is used as a processing unit, and a memory 110 is used as a storage device.

The number of processors 105 may be one or more. The processor 105 includes, for example, a central processing unit (CPU), a microprocessor, or the like. In a case where plural processors 105 are used, either a tightly coupled multiprocessor or a loosely coupled multiprocessor may be used. For example, plural processor cores may be mounted in one processor 105. Further, it may also be possible to use a system in which plural computers are virtually caused to behave as a single computer by connecting the plural computers through a communication path. As a specific example, a loosely coupled multiprocessor may be configured as a cluster system or a computer cluster. The processor 105 executes a program in a program memory 140.

The memory 110 may include, for example, a semiconductor memory in the processor 105 such as a register or a cache memory. The memory 110 may be a main storage device including a RAM (abbreviation of Random Access Memory) and a ROM (abbreviation of Read Only Memory), or the like, an internal storage device such as an HDD (abbreviation of Hard Disk Drive) or an SSD (abbreviation of Solid State Drive) having a function as a permanent storage device, an external storage device or an auxiliary storage device such as a CD, a DVD, a Blu-ray (registered trademark) Disc, a USB memory (USB flash drive), or a memory card. The memory 110 may include a storage device such as a server connected via a communication line.

The memory 110 includes a data memory 120 for storing data and a program memory 140 for storing programs. The data memory 120 and the program memory 140 may store a program such as an OS for starting the computer, data such as a parameter appropriately changed in execution of the module, or the like, in addition to the information shown and the module program.

The output device 185 includes, for example, a display device 187, a printing device 189, or the like. A display device 187 such as a liquid crystal display, an organic EL display, a three-dimensional display, or a projector displays a processing result by the processor 105, data in the data memory 120, or the like as text, image information, or the like. A printing device 189, such as a printer or a multifunction device, prints the processing result by the processor 105, the data in the data memory 120, or the like. The output device 185 may include a speaker, an actuator for vibrating the device, or the like.

The reception device 190 includes, for example, an instruction reception device 192, a document reading device 194, or the like. The instruction reception device 192 such as a keyboard, a mouse, a microphone, or a camera (including a line-of-sight detection camera or the like) receives data based on an operation (including a motion, a voice, a line of sight, or the like) of a user with respect to the instruction reception device 192.

Further, a touch screen may be provided with both functions of the display device 187 and the instruction reception device 192. In this case, even when there is no physical key, a keyboard image may be drawn on the touch screen by software so as to realize the function of the keyboard (also called a software keyboard, a screen keyboard, or the like).

A display device 187 and an instruction reception device 192 are used as a user interface.

A document reading device 194 such as a scanner or a camera reads or photographs a document and receives the generated image data.

The communication device 195 is a communication line interface such as a network card for connecting to another device via a communication line.

For a portion based on a computer program in the exemplary embodiment, the computer program that is software is read into the program memory 140 of the hardware configuration, and the software and the hardware resources cooperate with each other to realize the exemplary embodiment. That is, the exemplary embodiment is specifically realized by using hardware resources (including at least the processor 105, the memory 110, and in some cases the output device 185, the reception device 190, and the communication device 195) by the information processing by software, and the law of nature is used as a whole.

Note that the hardware configuration illustrated in FIG. 1 illustrates one configuration example, and the exemplary embodiment is not limited to the configuration illustrated in FIG. 1, but may be any configuration as long as the module described in the exemplary embodiment is executable. For example, as the processor 105, a GPU (abbreviation of Graphics Processing Unit, including GPGPU (abbreviation of General-Purpose Graphics Processing Units)) may be used, some of the modules may be executed by dedicated hardware (for example, an integrated circuit for a specific application (as a specific example, an ASIC (abbreviation of Application Specific Integrated Circuit) or the like) or a reconfigurable integrated circuit (as a specific example, an FPGA (abbreviation of Field-Programmable Gate Array) or the like), some modules may be in an external system and connected by a communication line, further, plural systems illustrated in FIG. 1 may be connected to each other by a communication line so as to cooperate with each other. In addition, in addition to a personal computer, the hardware may be incorporated into a portable information communication device (including a portable phone, a smartphone, a mobile device, a wearable computer, or the like), an information appliance, a robot, a copier, a fax machine, a scanner, a printer, a multifunction device (an image processing apparatus having two or more functions of a scanner, a printer, a copier, a fax machine, or the like), or the like.

The processor 105 is connected to the memory 110, the output device 185, the reception device 190, and the communication device 195 via the bus 198. The processor 105 executes processing according to a computer program describing an execution sequence of each module that is a program in the program memory 140. For example, when an operation of the user is received by the instruction reception device 192, processing by a module corresponding to the operation in the program memory 140 is executed, the processing result is stored in the data memory 120, output to the display device 187, or transmitted to another device by controlling the communication device 195.

The memory 110 includes a data memory 120 and a program memory 140, and is connected to the processor 105, the output device 185, the reception device 190, and the communication device 195 via the bus 198.

The data memory 120 includes a user management data storage module 122 and a business card image storage module 124.

The user management data storage module 122 stores information related to a user. Here, the user is a person who may become a participant of the conference. For example, a correspondence relationship between the user and the group that indicates which group the user belongs is stored. For example, a user group management table 1300 described later in the example of FIG. 13 or the like is stored.

The business card image storage module 124 stores a business card image of a participant of the conference. Here, the business card image is an image obtained by reading a business card of a participant (a business card owned by the participant or a business card in which the name of the participant is described). Specifically, an actual business card (material is not limited, but, for example, a business card of paper, plastic, or the like) is electronically read by a scanner, a camera, or the like.

The program memory 140 stores a user management module 142 and a business card image display control module 144.

The user management module 142 manages the participant participating in the conference.

In a conference via a communication line by plural participants, the business card image display control module 144 performs controls such that a first business card image that is an image obtained by reading a business card of the first participant is specified based on an image obtained by photographing the first participant of the conference, and the first business card image is displayed in a display manner different from a display manner of the second business card image of the other second participant. The first participant and the second participant are different, and of course, the first business card image is also different from the second business card image.

The specifying of the first business card image may be extraction from the business card image storage module 124 or extraction from a business card image displayed on a terminal of a user.

Here, the different display manner includes changing a shape, a pattern, or a color of a business card image, or adding a character, a graphic, a symbol, or the like, or a combination thereof in comparing the first business card image and the second business card image. Moreover, displaying only the first business card image without displaying the second business card image (the second business card image is in an invisible form (transparent form), and the first business card image is in the original visible form) is included. Further, the change may be not only statically changed (only one time is changed, and thereafter the form is maintained), but also dynamically changed (for example, flash, animation, or the like), or blinking (a change target in blinking includes whether or not to blink, the period during which blinking is performed, the interval between blinking, or the like).

The first participant may be a participant designated by the user. For example, when the video of the participant of the conference is selected by the operation of the user, the selected participant is the first participant.

In addition, the first participant may be the participant that is displayed in the largest size in the terminal of the user at the timing designated by the user.

The "timing designated by the user" corresponds to, for example, a timing when a "business card search button" displayed on the screen of the terminal of the user as described later is selected, or a timing when a predetermined key of the keyboard is selected.

The "participant displayed most largely" is the participant displayed in the largest size among the plural participants displayed on the terminal of the user. For example, in a conference system in which the size of the video of the participant is to be designated by the user, the first participant is the participant that is displayed in the largest size according to the designation by the user. In addition, in the conference system having the function of displaying the participant that is speaking in the largest size, the first participant is the participant that is speaking. The area using in determination of "most largely" may be the area of the region displaying the participant (generally, a rectangle region), or may be the area of the video of the participant themself in the region. In the latter case, a technique of recognizing a person from the image and cutting out the person may be used.

The first participant may be a participant that is speaking.

Whether or not the participant is speaking may be determined based on whether or not sound is transmitted from the terminal of each participant, or may analyze the area around the mouth in the photographed face image. As an example of the former, it may be determined that the participant is speaking when there is voice information collected by the microphone of the terminal, or it may be determined that the participant is speaking when a language is recognized by using voice recognition. As an example of the latter, a case where it is determined that the participant is speaking, includes that, for example, mouth movement is detected, mouth is open, teeth is detected, or the like.

Further, the first participant may be a participant that is speaking at a timing designated by the user.

In a case where the business card image of the participant is distinguished and displayed following the participant that is speaking, the business card image displayed in a distinguished manner is changed each time the speaker is changed, but in this process, the user may actively instruct the timing of the distinction display. As described above, the "timing designated by the user" corresponds to, for example, a case where a "business card search button" is displayed on the screen of the terminal of the user as described later, and the "business card search button" is selected, or a case where a predetermined key of the keyboard is selected.

When the conference is started, the business card image display control module 144 may receive a set of a business card image and a face image from the terminal of each participant. That is, the business card image and the face image are stored in association with each other. Then, the business card image display control module 144 may specify the first business card image by comparing the image photographed by the first participant with the face image.

As the process of "specifying the first business card image by comparing", specifically, the face image most similar to the image obtained by photographing the first participant may be specified, and the business card image (the business card image received together with the face image) paired with the specified face image may be specified. The comparison process may be a simple comparison process (for example, an exclusive OR operation, or the like), or may be performed after a person in the image is recognized. Since the face image to be compared here is photographed when the conference is started, the face image may be accurately specified since there is almost no aging of the face in the video during the conference. Then, the business card images corresponding to the most matching face image may be distinguished from each other and displayed.

In addition, the business card image display control module 144 may control the participant belonging to the group of the users so as not to be the first participant. That is, since the participants belonging to the same group have already known the names, it is not necessary to distinguish and display the business card images of the participants.

Whether or not "the participant is belongs to the group of the users" may be determined using the data managed in association with the user and the group. That is, it is only necessary to specify the group (A) to which the user belongs from the data and determine whether or not the group (A) belongs to the group to which the target participant belongs.

In addition, the business card image display control module 144 may control the participant that does not belong to the group of the users to be the first participant. In other words, participants that are not the same group often do not know the name, and therefore, the business card images of those participants are targeted for distinction display.

Further, the business card image display control module 144 may control the participant belonging to the group of the users to be the second participant.

The business card image of the participant belonging to the group of the users may be controlled so as not to be displayed to the user.

In addition, only a business card image of a participant that does not belong to the group of the user may be controlled to be displayed to the user.

Figure 2:
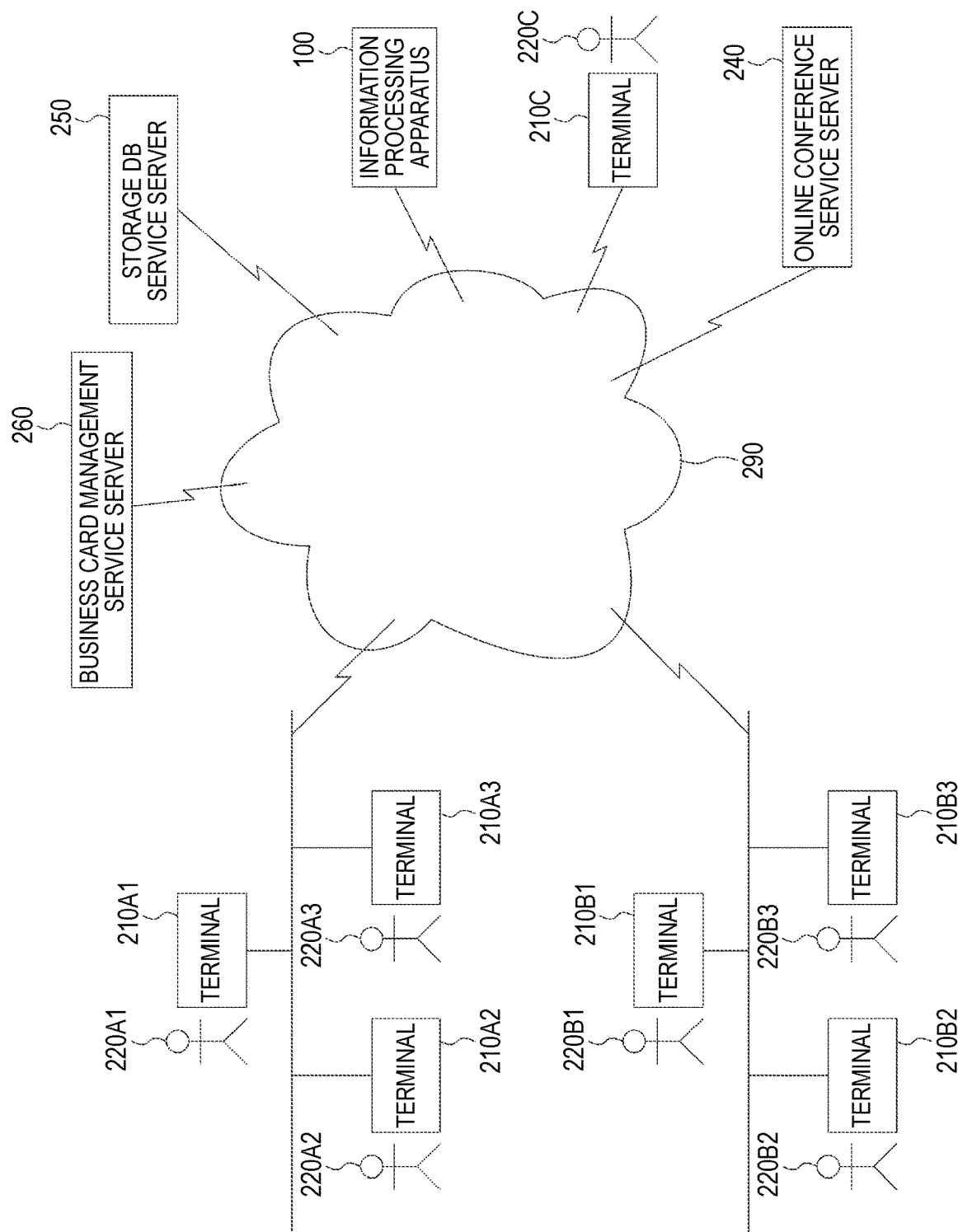
FIG. 2 is an explanatory diagram illustrating a system configuration example using the exemplary embodiment.

FIG. 2 is an explanatory diagram illustrating an example of a system configuration using the exemplary embodiment.

The information processing apparatus 100, a terminal 210A1, a terminal 210A2, a terminal 210A3, a terminal 210B1, a terminal 210B2, a terminal 210B3, a terminal 210C, an online conference service server 240, a storage DB service server 250, and a business card management service server 260 are connected to each other via a communication line 290. The communication line 290, the communication line connecting the terminal 210A1, the terminal 210A2, and the terminal 210A3, the communication line connecting the terminal 210B1, the terminal 210B2, and the terminal 210B3 may be wireless, wired, or a combination thereof, and may be, for example, the Internet, an intranet, or the like as a communication infrastructure. The functions of the information processing apparatus 100, the online conference service server 240, the storage DB service server 250, and the business card management service server 260 may be realized as a cloud service.

A user 220 (user 220A1, user 220B1, user 220C, or the like) that may be the participant of the conference has the terminal 210 (terminal 210A1, terminal 210B1, terminal 210C, or the like). The terminal 210 has a communication function, and includes a display device, a microphone, a camera, and a speaker (including an earphone and a headphone) for holding a conference. For example, a personal computer (including a notebook computer), a mobile information communication device, or the like is applicable.

As described above, the information processing apparatus 100 has the function of displaying the business card image of the participant of the online conference.

The online conference service server 240 has a function of performing a process for realizing a conference via a communication line. The process itself related to the online conference may be use an existing technique.

The storage DB service server 250 is used by the information processing apparatus 100, the online conference service server 240, the business card management service server 260, or the like, stores data, and functions as a database.

The business card management service server 260 has a function of a business card management service, and manages information related to a business card of each user 220. Here, the business card includes a business card of the user 220 itself and a business card received by the user 220. Examples of the information related to the business card include information described in a business card (name, company name, affiliation organization, or the like, position name, address, telephone number, mail address, or the like), date and time at which the business card is received, a business card image, or the like. The information related to the business card may be shared by a group member (user 220) belonging to the same group in addition to being used by the user 220 that has registered the information related to the business card in the business card management service server 260.

The online conference service server 240, the storage DB service server 250, the business card management service server 260, and the information processing apparatus 100 may provide independent services, may provide services in cooperation with each other, or may combine two or more servers to provide plural functions thereof as one service. For example, the information processing apparatus 100 may provide a function as a WEB service independently of the online conference service server 240. The information processing apparatus 100 may provide a service in cooperation with the business card management service server 260. The function of the information processing apparatus 100 may be incorporated into the online conference service server 240 such that a business card image is displayed as a function of the conference service.

When the information processing apparatus 100 independently provides a service, the participant of the conference does not need to be the user of the same business card management service. That is, the participant of the conference may be a user of a different business card management service, or may not use the business card management service itself.

The information processing apparatus 100 according to the present exemplary embodiment performs the following process, for example.

The display service of the business card image provided by the information processing apparatus 100 issues the URL for accessing the Web UI for displaying the business card image, and opens the Web UI for displaying the business card image from the URL at the time of the conference by the online conference service server 240, so that the business card image may be displayed during the conference.

As described above, the Web UI may distinguish the business card images of the participant designated by the user, the participant that is displayed in the largest size in the terminal of the user, the participant that is speaking, the participant that does not belong to the group of the users, or the like and display them. These participants are often the ones that the user wants to know. That is, even when a business card exchange (corresponding to a face-to-face business card exchange and actually a business card image) is performed online, sometimes the correspondence relationship between the face of the person that has exchanged the business card and the business card image is not known, and there is a case where it is difficult to know that is displayed on the screen during the online conference.

For example, the user 220A1, the user 220A2, and the user 220A3 belong to the same group, and the user 220B1, the user 220B2, and the user 220B3 of another company belong to a different group. When these people use an online conference, for example, the user 220A1 may want to display the face images of the user 220B1, the user 220B2, and the user 220B3 of another company in correspondence with the business card images. The information processing apparatus 100 displays (for example, highlights) business card images of the user 220B1 that requested the "business card search" request by the user 220A1, the user 220B1 that is displayed in the largest size in the terminal 210A1, and the user 220B1 that is speaking, or the like in a form different from the business card image of the user 220A2.

Further, the Web UI may freely change the arrangement of the displayed business cards. Even in the information processing apparatus 100 independent of the conference, business cards may be arranged according to the display order of the conference participants.

Figure 3:
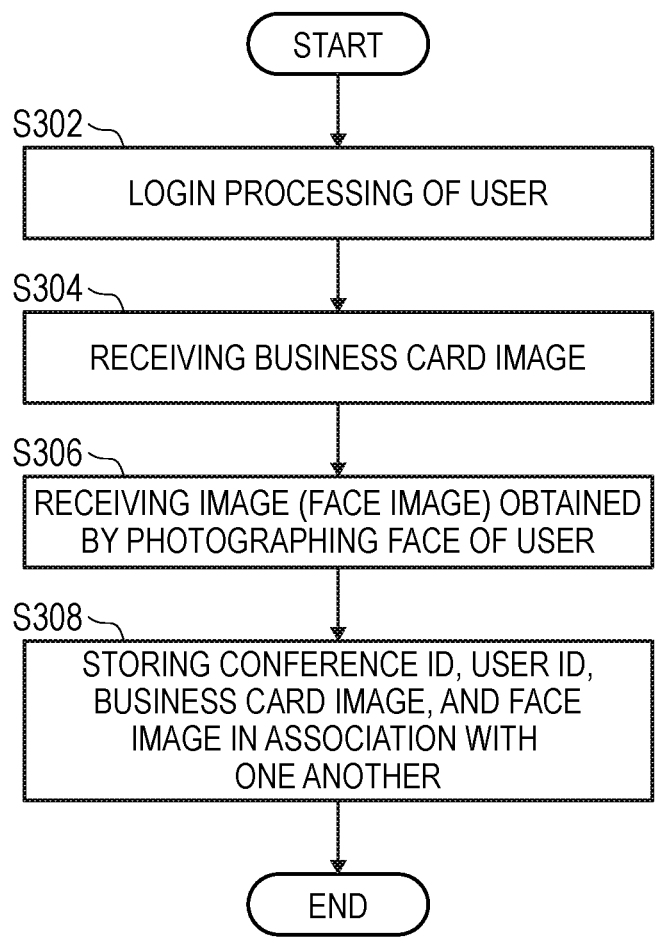
FIG. 3 is a flowchart illustrating a process example according to the exemplary embodiment.

FIG. 3 is a flowchart illustrating a process example according to the exemplary embodiment (the information processing apparatus 100). An example of a process of registering a face image and a business card image of a user when starting a conference is shown.

The process according to the flowchart illustrated in the example of FIG. 3 is performed at least once before the conference is held. For example, in the case of the second and subsequent conferences, this process may be omitted.

In step S302, login process of the user is performed. The login process is performed on the information processing apparatus 100, and the login process is performed via the terminal 210. For example, input of a combination of a user ID and a password, reading of biological information such as a fingerprint, or the like are performed. The information related to the conference is managed by, for example, a reservation information table 400.

FIG. 4 is an explanatory diagram illustrating an example of the data structure of the reservation information table 400. The reservation information table 400 includes a conference ID column 402, a start date and time column 404, a conference time column 406, a user ID column 408, a user password column 410, and a URL column 412. In the exemplary embodiment, the conference ID column 402 stores information for uniquely identifying a conference (specifically, conference ID: abbreviation of conference ID). The start date and time column 404 stores the start date and time of the target conference. The time in the start date and time column 404 is the date and time when the conference is started. The conference time column 406 stores the conference time of the target conference. The time in the conference time column 406 is a time period from the start to the end of the conference. In the exemplary embodiment, the user ID column 408 stores information (specifically, user ID) for uniquely identifying a user that uses the business card image display service. Here, the user ID is not limited as long as the user ID identifies the participants of the conference. For example, a name, a mail address, or the like may be used. The user password column 410 stores a password used for authentication of the user. The URL column 412 stores a URL for the user to use the business card image display service. Specifically, the URL is a URL for displaying a business card image. When the user accesses the URL, a business card image of another participant in the conference is displayed. That is, a business card image of another participant is stored in the URL. It should be noted that a business card image of the user themself to be accessed may be stored.

In step S304, a business card image is received. The user reads a business card of the user in advance with a scanner or the like, and generates a business card image. The business card image is transmitted from the terminal 210 to the information processing apparatus 100.

In step S306, an image (face image) obtained by photographing the face of the user is received. The face of the user is photographed by using a camera provided in the terminal 210, and the face image of the user is transmitted from the terminal 210 to the information processing apparatus 100.

In step S308, the conference ID, the user ID, the business card image, and the face image are stored in association with each other. For example, an image management table 500 is generated. The user ID determined in the login process in step S302, the business card image received in step S304, and the face image received in step S306 are used. The conference ID may be input by the user, or may specify a conference held within a predetermined period from that time (for example, a conference held or held within 30 minutes before and after) and the user participates in.

FIG. 5 is an explanatory diagram illustrating an example of the data structure of the image management table 500.

The image management table 500 includes a conference ID column 502, a participant number column 504, a user ID column 506, a business card image column 508, a face image column 510, or the like. The conference ID column 502 stores a conference ID. The participant number column 504 stores the number of participants in the conference. The set of the user ID column 506, the business card image column 508, and the face image column 510 continues according to the number of participants. The user ID column 506 stores a user ID. The business card image column 508 stores a business card image of the user. The face image column 510 stores a face image of the user.

Figure 6:
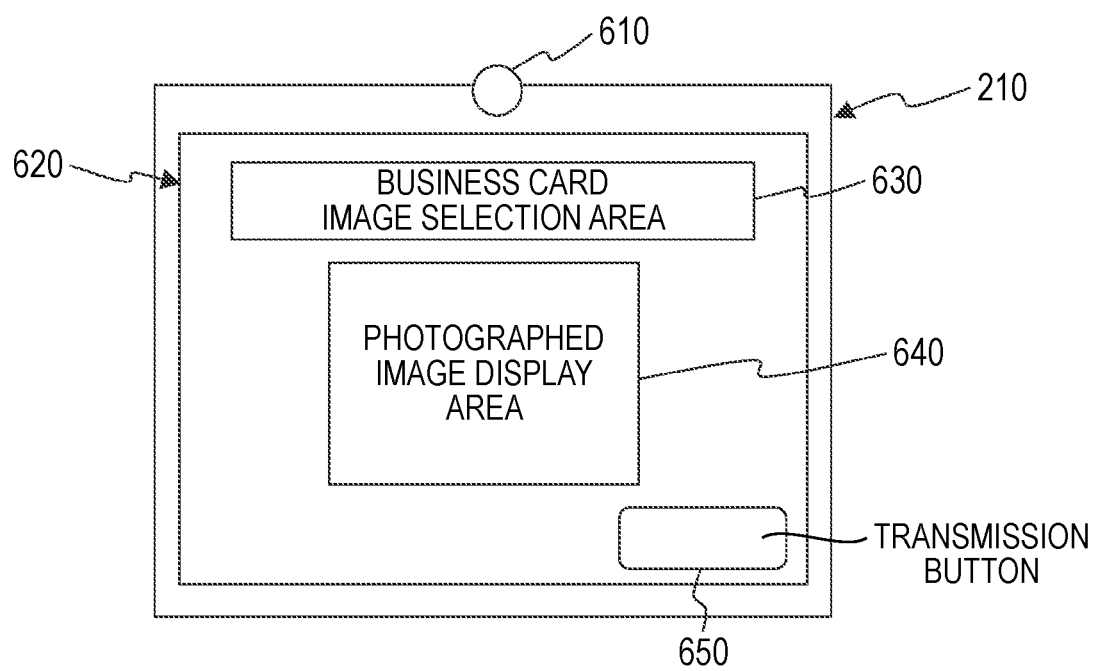
FIG. 6 is an explanatory diagram illustrating a display example according to the exemplary embodiment.

FIG. 6 is an explanatory diagram illustrating the display example according to the exemplary embodiment. Steps S304 and S306 of the flowchart illustrated in the example of FIG. 3 illustrate display examples on the terminal 210 side. That is, the steps illustrate a display example when a business card image is selected by the user and photographing of a face image is performed, and the display is controlled by the information processing apparatus 100.

The terminal 210 includes a camera 610 and a screen 620. The personal computer is, for example, a notebook computer or a tablet personal computer.

On the screen 620 of the terminal 210, a business card image selection area 630, a photographed image display area 640, and a transmission button 650 are displayed. The business card image selection area 630 is a column for the user to designate the business card image of themself. For example, a file name of the business card image may be input, or plural images stored in the terminal 210 may be displayed so as to be selectable so that the business card image may be selected by the user. The photographed image display area 640 is a region for displaying an image photographed by the camera 610. Since the user faces the screen 620 (that is, the camera 610), the camera 610 photographs the face of the user, and the user views the face image of themself in the photographed image display area 640. When the transmission button 650 is selected by the user, the business card image selected in the business card image selection area 630 and the face image photographed in the photographed image display area 640 are transmitted to the information processing apparatus 100. At this time, needless to say, the user ID indicating the user is also transmitted to the information processing apparatus 100. Note that the transmission button 650 may be selectable on condition that a business card image is selected and a front face image is displayed in the photographed image display area 640. When the condition is not satisfied, the transmission button 650 may be grayed out so as not to be selected.

Figure 7:
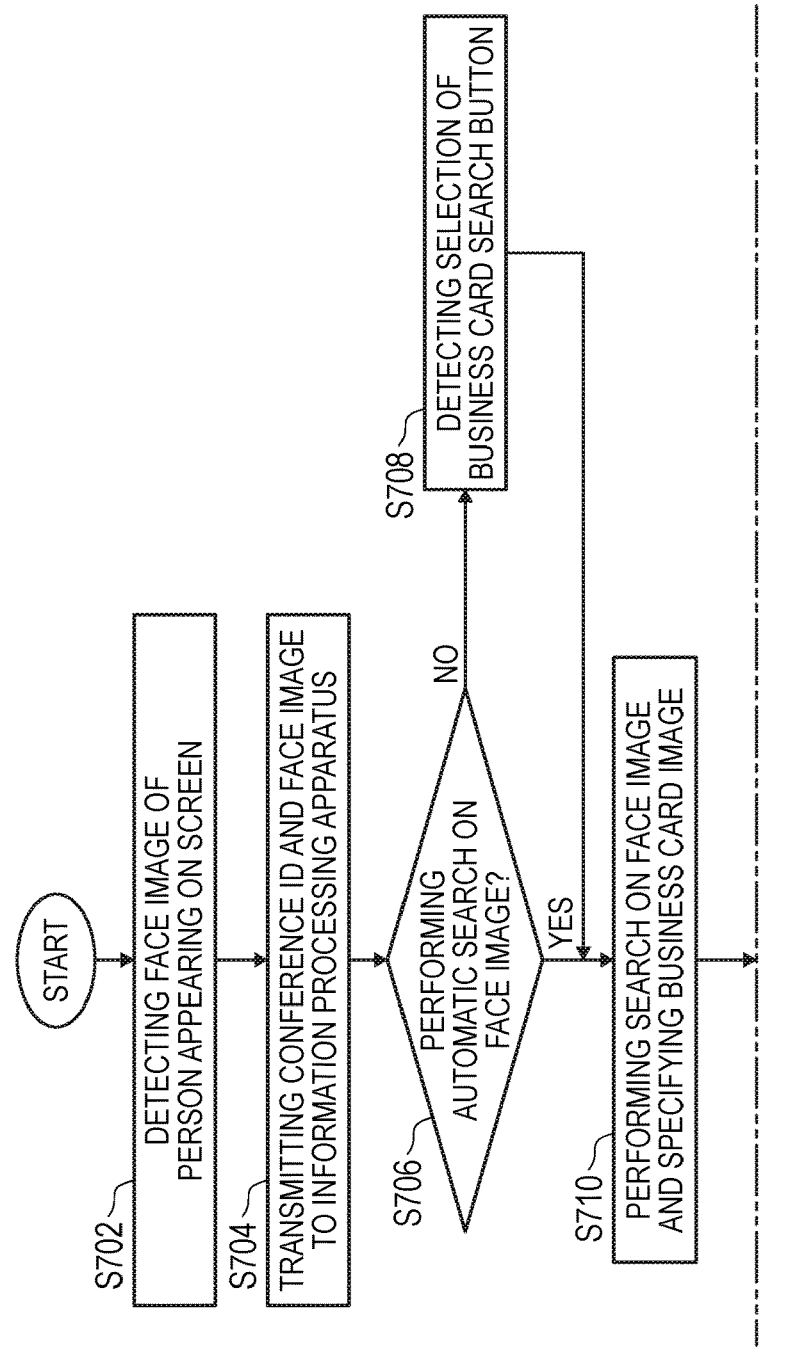
FIG. 7 is a flowchart illustrating a process example according to the exemplary embodiment.

FIG. 7 is a flowchart illustrating a process example performed by the exemplary embodiment (the information processing apparatus 100 and the terminal 210). The process example in which a business card image of a participant displayed on the screen of the terminal 210 is specified from plural registered business card images, and the business card images are distinguished and displayed on the screen is shown.

In step S702, a face image of a person appearing on the screen is detected. The process is performed by the terminal 210. Note that the information processing apparatus 100 may perform the process. For example, the terminal 210 may perform a screen shot process on the screen, transmit an image based on the screen shot to the information processing apparatus 100, or transmit the conference video transmitted from the online conference service server 240 to the target terminal 210 to the information processing apparatus 100. Thereafter, the information processing apparatus 100 may perform the process of step S702.

In step S704, the terminal 210 transmits the conference ID and the face image to the information processing apparatus 100. The face image detected in step S702 and the conference ID when participating the conference by the terminal 210 are transmitted to the information processing apparatus 100. When the information processing apparatus 100 performs the process of step S702, the process of step S704 is not required. However, the information processing apparatus 100 may acquire the conference ID from the terminal 210 when receiving the image by the screen shot, and may acquire the conference ID from the online conference service server 240 when receiving the conference video.

In step S706, it is determined whether or not an automatic search is performed on the face image, and when the automatic search is performed on the face image, the process proceeds to step S710, otherwise, the process proceeds to step S708. Whether or not to perform the automatic search may be predetermined or may be set by each user. The setting by the user will be described later with reference to an example of FIG. 9. When the process proceeds to step S708, the user designates the automatic search. When the process proceeds to step S710, the video of the participant is monitored in real time. In addition, when the process proceeds to step S710, when it is detected that different participants are displayed, the face image of the participant may be automatically searched.

In step S708, it is detected that the business card search button has been selected by the user. The "timing designated by the user" is an example, and will be described later with reference to an example of FIG. 10.

In step S710, a search is performed on the face image, and a business card image is specified. Specifically, a face image most similar to the face image to be searched may be searched from the face image column 510 of the image management table 500, and a business card image corresponding to the face image may be specified from the business card image column 508 of the image management table 500.

In step S712, it is determined whether or not only the specified business card image is displayed, and when only the specified business card image is displayed, the process proceeds to step S716, otherwise, the process proceeds to S714. That is, it is determined whether only one business card image specified in step S710 is displayed or plural business card images of other participants are displayed. Whether or not to display only the specified business card image may be predetermined or may be set by each user. The setting by the user will be described later with reference to an example of FIG. 9.

In step S714, the distinguished display is performed by the set method. Here, the setting may be predetermined or may be set by each user. The setting by the user will be described later with reference to an example of FIG. 9.

In step S716, it is determined whether or not a business card image is to be displayed near the face, and when the business card image is displayed near the face, the process proceeds to step S718, otherwise, the process proceeds to step S720. That is, it is determined whether or not the business card image of the participant is displayed close to the video of the participant on the screen of the terminal 210. The setting of whether or not to display a business card image near the face may be predetermined or may be set by each user. The setting by the user will be described later with reference to an example of FIG. 9.

In step S718, the business card image is enlarged and displayed near the face. That is, the enlarged image of the business card image of the participant is displayed close to the video of the participant on the screen of the terminal 210.

In step S720, the image is enlarged and displayed at the designated location on the screen. The designation location of the screen is assumed to be the upper right, the lower right, the upper left, the lower left, or the like of the screen of the terminal 210. The designated location may be predetermined or may be set by each user. The setting by the user will be described later with reference to an example of FIG. 9.

In step S722, it is determined whether or not the business card image is automatically deleted, and when the business card image is deleted, the process proceeds to step S724, otherwise, the process proceeds to step S726. Whether or not to be automatically deleted may be predetermined, or may be set by each user. The setting by the user will be described later with reference to an example of FIG. 9.

In step S724, it is determined whether or not a certain period of time has elapsed, and if a certain period of time has elapsed, the process proceeds to S728, otherwise, the process waits until a certain time has elapsed. Here, the certain period of time (length of time) may be a predetermined value or may be set by each user. The setting by the user will be described later with reference to an example of FIG. 9.

In step S726, selection of a button for closing a business card image that is an operation of the user is detected.

In step S728, the business card image is closed.

As the process performed in step S710 via step S708, the process as follows may be performed.

(1) When the user selects the business card search button 1062 after designating the face image of the participant on the screen 620 of the terminal 210 used by the user, the designated face image is set as the search target. The process is a specific example of "the first participant is a participant designated by the user".

(2) When it is detected that the user has selected the business card search button 1062, the face image of the participant displayed in the largest size on the screen 620 of the terminal 210 used by the user is set as the search target. The process is a specific example of "the first participant is a participant displayed most largely at a terminal of a user at a timing designated by the user".

(3) When it is detected that the user has selected the business card search button 1062, the face image of the participant that is speaking among the participants of the conference in which the user is participating is set as the target of the search. The process is a specific example of "the first participant is a participant that is speaking" and "the first participant is a participant that is speaking at a timing designated by a user".

As the process performed in step S710 without passing through step S708 (that is, in the case of "Yes" in step S706), the process as follows may be performed.

(1) The face image of the participant displayed on the screen 620 of the terminal 210 used by the user is set as the search target.

(2) The face image of the participant displayed in the largest size on the screen 620 of the terminal 210 used by the user is set as the search target.

(3) The face image of the participant that is speaking among the participants of the conference in which the user is participating is set as the search target. The process is a specific example of "the first participant is a participant that is speaking".

Figure 8:
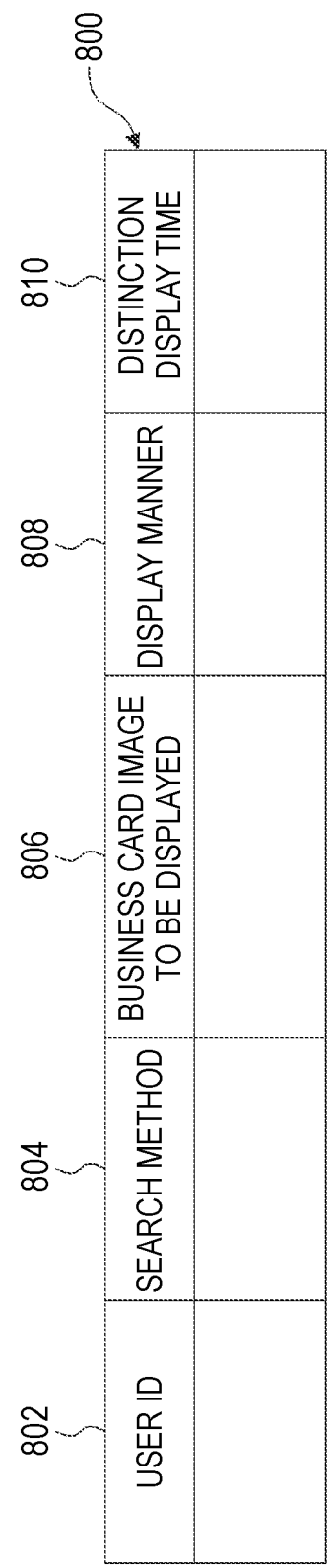
FIG. 8 is an explanatory diagram illustrating an example of a data structure of a display method management table.

The determination process of step S706, step S712, step S716, and step S722 may be performed using, for example, a display method management table 800. FIG. 8 is an explanatory diagram illustrating an example of the data structure of the display method management table 800. The display method management table 800 is set for each user. The display method management table 800 includes a user ID column 802, a search method column 804, a business card image to be displayed column 806, a display manner column 808, and a distinction display time column 810. The user ID column 802 stores a user ID. The search method column 804 stores a search method. The search method column 804 stores, for example, either (1) information indicating that the search is performed automatically on the face image, or (2) information indicating that the search is performed under the selection of the business card search button. The business card image to be displayed column 806 stores a business card image to be displayed. The business card image to be displayed column 806 stores, for example, either (1) information indicating that the image is enlarged (or reduced) and displayed near the corresponding face image, or (2) information indicating that the display is enlarged (or reduced) and displayed at the designated location on the screen. The display manner column 808 stores a mode at the time of displaying. The distinction display time column 810 stores a distinction display time.

FIG. 9 is an explanatory diagram illustrating the display example according to the exemplary embodiment. The information processing apparatus 100 displays a setting screen 900 of a display method of the specified business card image on the terminal 210. The user may set the display method of the specified business card image with the setting screen 900, and the setting result is stored in the display method management table 800. In order to display the searched business card image in a distinguished manner from the other business card images, the setting is performed by the setting screen 900 of the display method of the business card image specified by the client application in the terminal 210.

For example, the specified business card image is displayed as follows in the setting screen 900 of the display method of the business card image, as illustrated in FIG. 9.
[A setting screen of a display method of the specified business card]
Automatic search based on the face image
Search based on instructions with the business card search button
Display a list of exchanged business card images
   Display the specified business card image at the top
   Highlight the specified business card image
   Display the specified business card image in a larger size
Display only the specified business card image
   Display at the upper left (lower left) of the screen
   Display at the upper right (lower right) of the screen
   Display near the person image on the screen
Time to display the specified business card image in a distinguished manner from other business card images
Display within a fixed time
   One minute
   30 seconds
Display until manually deleted The "exchanged business card image" is a business card image registered in the information processing apparatus 100. Registering one's business card image when participating in a conference corresponds to face-to-face business card exchange.

According to these settings, the determination process in the flowchart illustrated in FIG. 7 is performed. In FIG. 9, an example where "automatic search based on the face image", "display a list of exchanged business card images", "highlight the specified business card image", "display within a fixed time", and "one minute" are selected is shown.

Here, setting examples in a case where "the first business card image is displayed in a display manner different from the display manner of the second business card image of the second participant" are shown. "Display the specified business card image at the top", "Highlight the specified business card image", and "Display the specified business card image in a larger size" are illustrated as different display manners in the case of "Display a list of exchanged business card images". Further, "display only the specified business card image" corresponds to displaying only the first business card image without displaying the second business card image, and is an example of the different display manner as described above.

Figure 10:
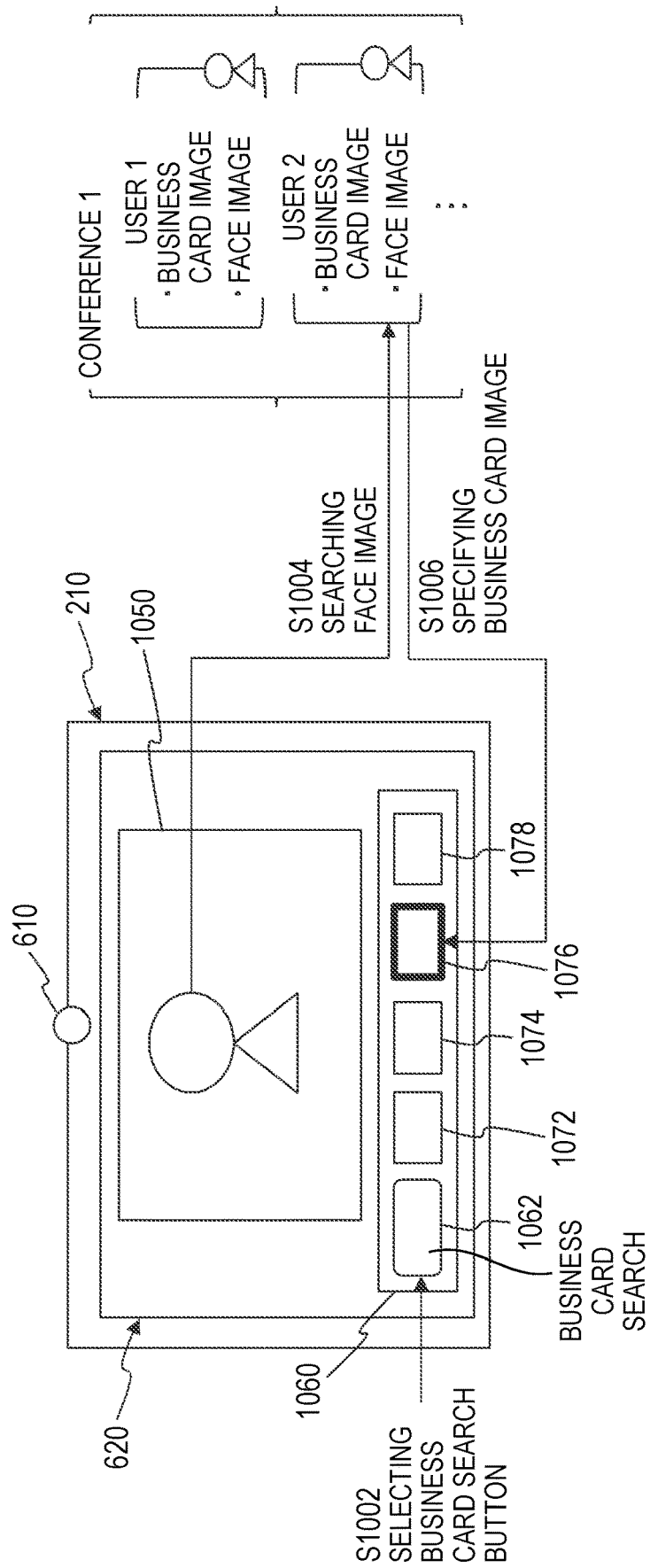
FIG. 10 is an explanatory diagram illustrating a process example according to the exemplary embodiment.

FIG. 10 is an explanatory diagram illustrating the process example according to the exemplary embodiment.

On the screen 620 of the terminal 210, a conference participant display area 1050, and a business card image display area 1060 are displayed.

In the conference participant display area 1050, a video of a participant of the conference (participant other than the participant that uses the terminal 210) is displayed. The display is displayed by the online conference service server 240.

In the business card image display area 1060, a business card search button 1062, a business card image 1072 of the participant of the conference, a business card image 1074, a business card image 1076, and a business card image 1078 are displayed. The display is displayed by the information processing apparatus 100.

The right side of FIG. 10 schematically shows the data of the face image and the business card image for each user. Specifically, the data of the face image and the business card image for each user corresponds to the image management table 500 shown in the example of FIG. 5.

In such a state, for example, the following process is performed.

In step S1002, the user selects the business card search button 1062.

In step S1004, a face image is searched. In the example of FIG. 10, when the business card search button 1062 is selected, the face image of the participant displayed in the conference participant display area 1050 becomes the search target. In a case where there are plural conference participant display areas 1050, a search target may be determined as follows. (1) The face image of the participant selected immediately before the business card search button 1062 is selected is set as the search target. (2) When the business card search button 1062 is selected, the face image of the participant displayed in the largest size in the screen of the terminal 210 is set as the search target. (3) The face image of the participant that is speaking when the business card search button 1062 is selected is set as a search target.

In step S1006, a business card image is specified. That is, a business card image corresponding to the face image searched in step S1004 is specified.

In step S1008, the specified business card image 1076 is highlighted. When the business card image is clicked, the business card image may be enlarged and displayed.

By the display, the user that has selected the business card search button 1062 may understand that the business card of the participant displayed in the conference participant display area 1050 is the business card image 1076, and the name or the like of the person may be seen.

FIGS. 11A and 11B are explanatory diagrams illustrating the display examples according to the exemplary embodiment.

The example illustrated in FIG. 11A illustrates an example in which the business card image 1176*a* is enlarged and displayed near the participant to be searched. The business card image 1176*a* is displayed close to a person in the conference participant display area 1050. This illustrates an example in which "displaying only the specified business card image" and "displaying near the person image on the screen" are set on the setting screen 900 of the display method of the specified business card image shown in the example of FIG. 9.

The example illustrated in FIG. 11B illustrates an example in which the business card image 1176*b* is displayed at the place where the screen 620 is fixed. The business card image 1176*b* is displayed on the upper right of the screen 620. This illustrates an example in which "displaying only the specified business card image" and "displaying on the upper right of the screen" is set on the setting screen 900 of the display method of the specified business card image shown in the example of FIG. 9.

Figure 12:
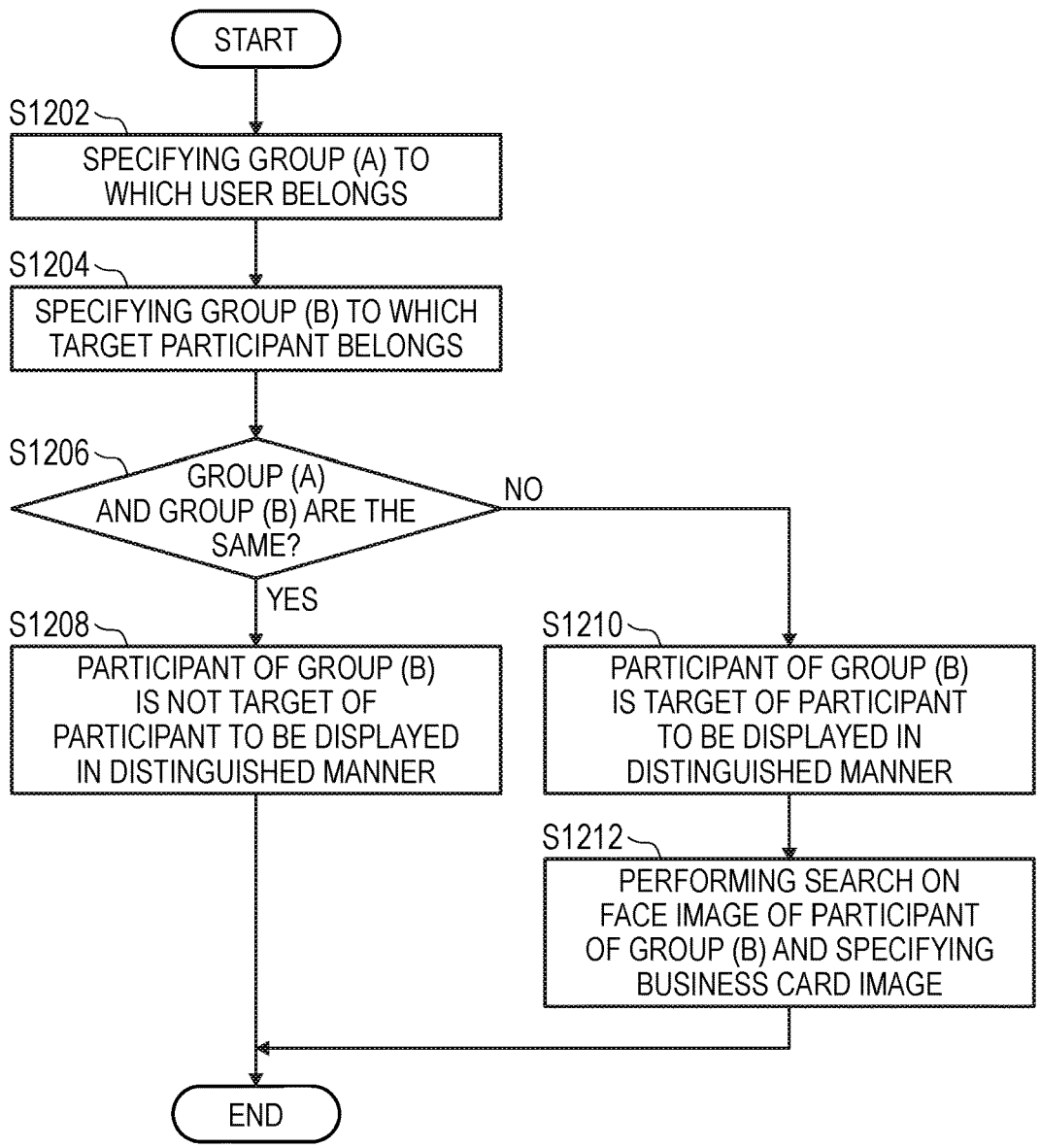
FIG. 12 is a flowchart illustrating a process example according to the exemplary embodiment.

FIG. 12 is a flowchart illustrating the process example according to the exemplary embodiment. The process of step S710 in the flowchart illustrated in FIG. 7 may be replaced with the process according to the flowchart illustrated in FIG. 12.

Here, the display manner of the business card image is changed depending on whether or not the participant corresponding to the business card belongs to the same group as the user. Here, the group includes plural persons, and corresponds to, for example, an organization (for example, a department, a section, etc.), a project plural persons join to act together for a certain purpose, or the like. The name or the likes of the participant belonging to the same group as the user is often known, and thus it may not be necessary to display the business card image, which may lead to efficient use of a limited screen.

Figure 13:
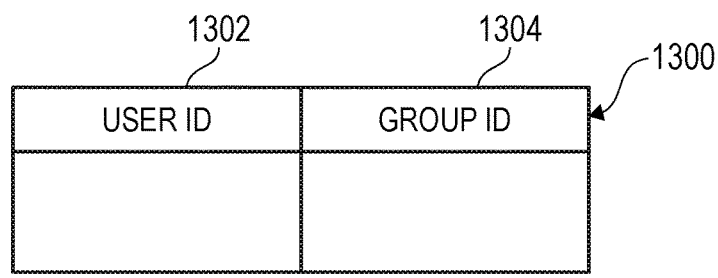
FIG. 13 is an explanatory diagram illustrating an example of a data structure of a user group management table.

In step S1202, a group (A) to which the user belongs is specified. For example, the user group management table 1300 may be used to specify the group (A). FIG. 13 is an explanatory diagram illustrating an example of the data structure of the user group management table 1300.

The user group management table 1300 includes a user ID column 1302 and a group ID column 1304. The user ID column 1302 stores a user ID. The group ID column 1304 stores information (specifically, group ID) for uniquely identifying a group in the exemplary embodiment.

In step S1204, a group (B) to which the target participant belongs is specified. For example, the user group management table 1300 may be used to specify the group (B).

In step S1206, it is determined whether or not the group (A) and the group (B) are the same, and when the group (A) and the group (B) are the same, the process proceeds to step S1208, otherwise, the process proceeds to step S1210.

In step S1208, the participant of the group (B) is not the target of the participant to be displayed in a distinguished manner. That is, since the participants belong to the same group, it is not necessary to display the business card image of the participant by highlight or the like.

In step S1210, the participant of the group (B) is the target of participants to be displayed in a distinguished manner from each other. The business card image of the target participant is displayed in a display manner different from the display manner of other business card images. That is, since the participant of the group (B) is a participant belonging to another group, it is necessary to display the business card image of the participant by highlight or the like.

In step S1212, a search is performed on the face image of the participant of the group (B), and the business card image is specified.

This process is repeated for the number of target participants. Thereafter, in the flowchart illustrated in FIG. 7, the processes in and after step S712 are performed. When all the target participants belong to the same group as the user, the process ends in the flowchart illustrated in FIG. 7.

In the exemplary embodiments above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration that are located physically apart from each other but may work cooperatively. The order of operations of the processor is not limited to one described in the exemplary embodiments above, and may be changed.

The program described above may be provided by being stored in a recording medium, or may be provided by a communication unit. In this case, for example, the program described above may be regarded as an invention of a "computer-readable recording medium storing a program".

The "computer-readable recording medium storing a program" refers to a computer-readable recording medium in which a program is recorded, which is used for program installation, execution, program distribution, or the like.

The recording medium is, for example, a digital versatile disc (DVD) such as a "DVD-R, DVD-RW, DVD-RAM, or the like" that is a standard established by the DVD Forum, "DVD+R, DVD+RW, or the like" that is a standard established by DVD+RW, a compact disk (CD) including read-only memory (CD-ROM), CD recordable (CD-R), CD rewritable (CD-RW), or the like, and a Blu-ray (registered trademark) disc, a magneto-optical disk (MO), a flexible disk (FD), a magnetic tape, a hard disk, a read-only memory (ROM), an electrically erasable programmable read-only memory (EEPROM (registered trademark)), a flash memory, a random access memory (RAM), a secure digital (SD) memory card, or the like.

The whole or a part of the program may be recorded in the recording medium and stored, distributed, or the like. In addition, the program may be transmitted by communication, for example, by using a transmission medium such as a wired network or a wireless communication network used for a local area network (LAN), a metropolitan area network (MAN), a wide area network (WAN), the Internet, an intranet, extranet, or the like, or a combination thereof, or may be carried on a carrier wave.

Further, the program may be a part or the whole of another program, or may be recorded on a recording medium together with a separate program. In addition, the program may be divided and recorded on plural recording media. In addition, the program may be recorded in any mode as long as the program is restorable by compression, encryption, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to
specify, in a conference in which a plurality of participants participate via a communication line, a first business card image obtained by reading a business card of a first participant of the conference based on an image obtained by photographing the first participant,
perform control such that the first participant, for which the first business card image is specified, does not belong to a group of a user, and
display to the user the first business card image in a display manner different from a display manner for a second business card image of a second participant of the conference, the second participant being different from the first participant.

2. The information processing apparatus according to claim 1, wherein
the first participant is a participant designated by the user.

3. The information processing apparatus according to claim 1, wherein
the first participant is a participant displayed most largely at a terminal of the user at a timing designated by the user.

4. The information processing apparatus according to claim 1, wherein
the first participant is a participant that is speaking.

5. The information processing apparatus according to claim 4, wherein
the first participant is a participant that is speaking at a timing designated by the user.

6. The information processing apparatus according to claim 1, wherein
the processor is configured to
receive, from each participant, a set of a business card image and a face image when the conference is started, and
specify the first business card image by comparing an image photographed by the first participant with the face image.

7. The information processing apparatus according to claim 1, wherein
the processor is configured to perform control such that the participant belonging to the group of the user is to be the second participant.

8. A non-transitory computer readable medium storing a program causing a computer to execute a process for information processing, the process comprising:
specifying, in a conference in which a plurality of participants participate via a communication line, a first business card image obtained by reading a business card of a first participant of the conference based on an image obtained by photographing the first participant;
performing control such that the first participant, for which the first business card image is specified, does not belong to a group of a user; and
displaying to the user the first business card image in a display manner different from a display manner for a second business card image of a second participant of the conference, the second participant being different from the first participant.

* * * * *